United States Patent Office 3,206,456
Patented Sept. 14, 1965

3,206,456
PURINOYL STEROIDS
Harvey E. Alburn, West Chester, and William Dvonch, Radnor, Pa., assignors to American Home Products Corporation, New York, N.Y., a corporation of Delaware
No Drawing. Filed Apr. 16, 1964, Ser. No. 360,423
5 Claims. (Cl. 260—239.5)

This invention is directed to novel purinoyl steroids. More particularly this invention is related to 3α-(9H-purine-6-carboxamido)-5α-pregnan-20-one and 3α-(9H-purine-6-carboxamido)-5α-pregnan-20-ol and to the method by which these new compounds are prepared.

The new compounds of the present invention considered in their broadest aspect include those compounds encompassed within the following structural formula:

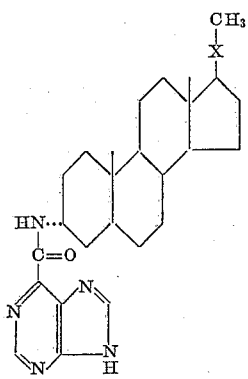

wherein X is selected from the group consisting of

and

The new steroid compounds within Formula I above are prepared according to the method of the present invention by reacting 6-trichloromethylpurine with funtumine or funtumidine in the presence of an inert solvent and NaHCO₃ solution. The reaction may be represented as follows:

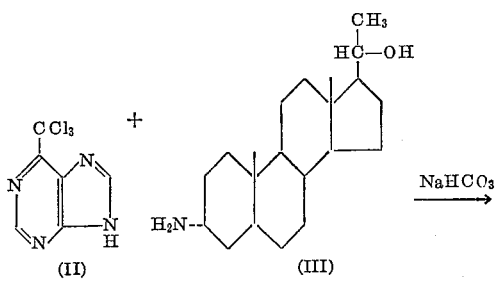

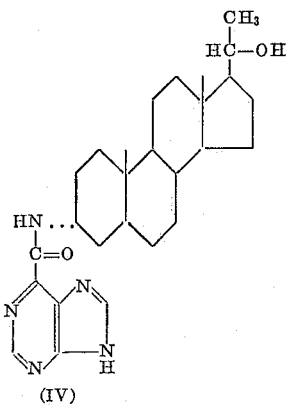

(IV)

The foregoing reaction sequence, which leads to the preparation of 3α-(9H-purine-6-carboxamido)-5α-pregnan-20-ol (IV) a species of the compounds of the present invention encompassed within Formula I above, is representative of the method by which the other compound encompassed within Formula I is prepared.

In preparing the new compounds of the present invention 6-trichloromethylpurine (II) is reacted with funtumine

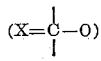

or funtumidine

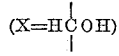

which is dissolved in an inert solvent such as dioxane, tetrahydrofuran, methanol, dimethylformamide, ethyl acetate or the like. The starting purine (II) is prepared according to the method described in J. Org. Chem. 27, 3,545–9 (1962), S. Cohen et al. According to this method, 6-methylpurine in a tri-fluoroacetic acid solution is converted to the desired 6-trichloromethyl product (II) by reaction with sulfuryl chloride or N-chlorosuccinimide. The funtumine or funtumidine (III) reactant starting material is prepared according to known methods such as is described in Compt. rend. Acad. Sci. 246, 3076, 1958. The reaction is carried out with stirring in the presence of NaHCO₃ solution. Normally stirring will be continued for a period of from about 2 to about 10 hours. The precipitated product is then filtered and can be recrystallized from ethanol-chloroform or other suitable solvent system according to conventional practice.

The new steroids of the present invention have valuable antiviral activity and are therefore useful for this purpose. When so utilized, the new steroids may be administered alone or in combination with pharmaceutically acceptable carriers. When oral administration is the preferred route of administration, the active principal may be combined with starch or milk sugar and tableted according to conventional practice. Alternatively, liquid compositions as solutions or emulsions may be prepared which can include, as described, suitable coloring or flavoring agents. Such solutions can be utilized orally, intravenously or parenterally as described.

The quantity of the active steroid compound (I) which may be combined with such carriers will vary depending on the nature of the carrier, the solubility of the steroid, the anticipated route of administration and the dosage desired. The dosage amount, which may vary between 10 and about 500 mg./day will vary for the particular steroid selected and the nature and condition of the subject of treatment. According to one method of administration, small dosages may be first used with increased dosages following up to an optimum level for the condition being treated.

These new steroids of the present invention also unexpectedly possess muscle relaxant properties and blood pressure reducing properties. They may therefore be used for those purposes.

Reference now to the examples which follow will provide a better understanding of the method by which the new compounds of the present invention are prepared as well as a better understanding of the compounds themselves.

*Example I*

Funtumine (6.35 g.; 20 mmole) dissolved in dioxane (400 ml.) is added to 6-trichloromethylpurine (2.38 g.; 10 mmole) in 2.5% sodium bicarbonate solution (400 ml.) with stirring. A precipitate begins to appear, and after 5–6 hours it is filtered off. The precipitate is dissolved in chloroform, and the solution concentrated to yield crude N-purinoylfuntumine [or 3α-(9H-purine-6-carboxamido)-5α-pregnan-20-one] (1.47 g.; 32% of theory). It is purified by dissolution in ethanol:chloroform (10:1) and concentration of the solution in vacuo to yield fine silky needles of the pure material, M.P. 312–314° C.

*Analysis.*—Calcd. for $C_{27}H_{37}N_5O_2$: C, 70.00; H, 8.05; N, 15.13. Found: C, 70.00; H, 8.15; N, 15.38.

Spectrum:

$\lambda_{max}^{KBr}$ 5.86 (C=O), 5.96 (amide C=O) μ

*Example II*

Funtumidine (4.94 g.; 15.5 mmole) dissolved in dioxane (400 ml.) is added to 2.5% sodium bicarbonate solution (400 ml.) with stirring. 6-trichloromethylpurine (2.38 g.; 10 mmole) is added, and the mixture stirred for 5–6 hours. The resulting precipitate is filtered off and recrystallized from ethanol:chloroform (10:1) to yield the crude N-purinoyl derivative of funtumidine (2.69 g.; 57% yield). Two further recrystallizations from the same solvent yield fine silky needles of the pure material as the hemihydrate, M.P. 325–328° C. This product is more properly identified as 3α-(9H-purine-6-carboxamido)-5α-pregnan-20-ol.

While the foregoing invention has been described in the specific examples set forth with considerable specificity, it is to be understood that such language was for purposes of providing a clear description and is not to be construed as limiting the invention. The same is to be limited only by the claims attached hereto.

The invention claimed is:

1. A compound having the formula:

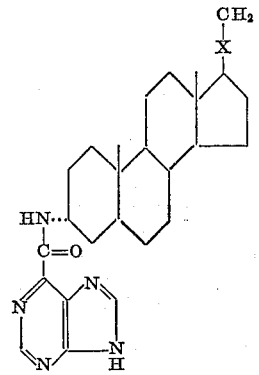

wherein X is selected from the group consisting of

and

2. 3α-(9H-purine-6-carboxamido)-5α-pregnan-20-one.

3. 3α-(9H-purine-6-carboxamido)-5α-pregnan-20-ol.

4. The method of preparing 3α-(9H-purine-6-carboxamido)-5α-pregnan-20-one which comprises reacting funtumine with 6-trichloromethylpurine in the presence of an inert solvent and a solution of $NaHCO_3$ and recovering the desired product.

5. The method of preparing 3α-(9H-purine-6-carboxamido)-5α-pregnan-20-ol which comprises reacting funtumidine with 6-trichloromethylpurine in the presence of an inert solvent and a solution of $NaHCO_3$ and recovering the desired product.

No references cited

LEWIS GOTTS, *Primary Examiner.*